Nov. 18, 1941.	M. DUCKSTEIN	2,263,073
LUBRICATING DEVICE FOR AIRCRAFT ENGINES
Filed May 6, 1939
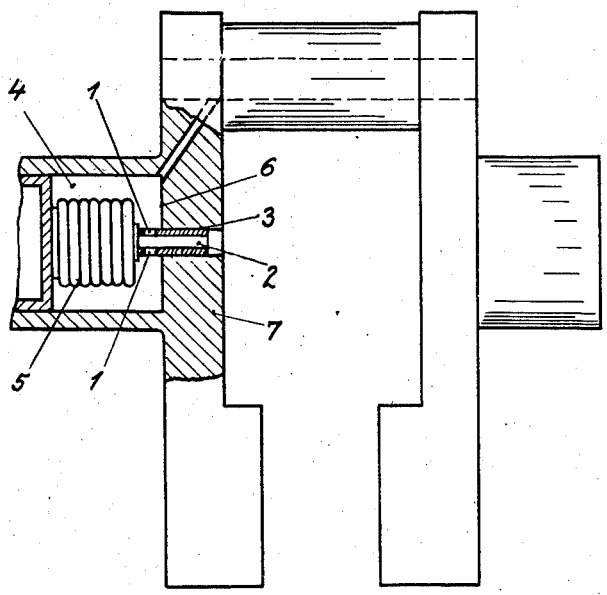
Inventor:
Martin Duckstein Patented Nov. 18, 1941

2,263,073

UNITED STATES PATENT OFFICE 2,263,073

LUBRICATING DEVICE FOR AIRCRAFT ENGINES

Martin Duckstein, Obermenzing, Munich, Germany, assignor to Bayerische Motoren Werke Aktiengesellschaft, Munich, Germany, a company of Germany Application May 6, 1939, Serial No. 272,123
In Germany May 11, 1938

2 Claims. (Cl. 184—6)

This invention relates to improvements in a lubricating device for aircraft engines, and more particularly to the automatic control of the flow of a lubricant into the crank case of a radial engine.

An object of this invention is to provide an improved arrangement for lubricating the engine driving mechanism mounted on the engine crank shaft.

Another object of this invention is the provision of a temperature-responsive device for controlling the injection of a lubricant upon the engine driving mechanism mounted on the engine crank shaft.

Still another object of this invention is to provide a simple device for controlling the injection of a lubricant upon the engine driving mechanism mounted upon the engine crank shaft in accordance with the temperature of the lubricant.

A comprehensive object of this invention is to provide an automatic lubricating device within the crank shaft of a radial engine for assuring a sufficient supply of lubricating oil of the moving parts of the engine while the oil is still cold during starting.

Other objects will appear from the following description of an illustrative embodiment of the invention taken together with the attached drawing, wherein the single figure is a side view, partially in cross-section, of a portion of an engine crank shaft illustrating the application of my improved temperature-responsive lubricating oil control device thereto.

As will be seen in the drawing, radial bores 1 lead to a longitudinal bore 2 of a slidable member 3, providing communication for the lubricating oil from the hollow space 4 to the engine crank case (not shown). The oil forced through the bore 2 will accordingly be sprayed upon the engine driving members such as the connecting rod (not shown) journaled upon the off-set portion of the crank shaft, and in the case of a radial engine, will also flow in such a manner as to lubricate the walls of the radially positioned cylinders. A suitable temperature-responsive device 5, here illustrated as a bellows of suitable flexible material positioned within the hollow space 4 of the crank shaft is adapted to slidably move the member 3 in response to the temperature condition of the oil within the hollow space 4. When the temperature-responsive device 5 is contracted to a position substantially as shown in the drawing, and it permits ready flow of the oil from the hollow space 4 through the radial bores 1 and the longitudinal bore 2 into the crank case and upon the connecting rod bearing. As the bellows 5 expands, the radial bores 1 will be moved to such a position that they will become throttled by the inner edge of the wall 6 of the space 4. Lubricating oil is supplied to the hollow space from a pressure lubricating system for the engine of any well known character, and in any suitable manner, or as shown, through bores leading from the bearing trunnion.

The basic adjustment of the heat responsive measuring box or bellows 6 and of the regulating device are such that in the case of cold oil the maximum throughflow necessary is exposed. As the oil is heated up the measuring box or bellows, expands, and thus moves the pivot in its guide, whereby the bores 1 are more or less closed by the pivot guide according to the movement and thus the oil outflow from the space 4 through the pivot bore 2 becomes less. The device acts in the reverse manner on a reduction in temperature of the lubricating oil so that by the regulating device according to the invention, the additional lubrication is correctly influenced; in the case of cold oil more lubricant is supplied and in the case of hot oil less lubricant. It thus follows that the present invention is of special advantage for lubricating the engine and particularly the cylinder surfaces thereof during the starting period when the engine and the lubricating oil are cold. At this time the device permits the flow of a large amount of oil which, as is well known in the case of radial engines will then be thrown outwardly under the action of centrifugal force to supply a large amount of oil to all of the cylinders.

It will be seen that the device of the present invention, while described in connection with radial engines, is obviously applicable to other types of engines such as those in which the cylinders are in line.

It is also of particular advantage, in addition to the simple form of construction which is thus certain in operation, for the variation of the throughflow cross-sectional area, according to the invention, also to enable the change to be effected solely by the slight force emanating from the measuring box, and thus not require the otherwise necessary auxiliary actuating device. Further when modifying the cross-sectional area, according to the invention, by longitudinal movement of a cylindrical pivot in its guide, a wedging of the regulating device by any oil carbon which may be deposited or in the case of very viscous oil, is almost completely excluded. In contrast to the regulating cones which have been used mostly for this purpose hitherto, which by reason of wedging and sticking were very frequently the cause of disturbances in the correct operation of these devices, the construction according to the invention affords to a large extent a certain operation of the additional lubricating device.

It will be noted that the construction shown and described will serve admirably to accomplish the object stated above. It is to be understood, however, that the construction disclosed above is intended merely as illustrative of the invention and not as limiting, as various modifications thereof may be made without departing from the invention as defined by a proper interpretation of the claims which follow.

I claim:

1. In an internal combustion engine provided with a crank shaft having a hollow trunnion adapted to be supplied with lubricating oil, and a bore connecting the interior of said trunnion with the crank case of the engine, in combination, a hollow close-fitting slide slidably mounted in said bore, closed at one end within the hollow trunnion, open at its other end toward said crank case, and having one or more radial openings near the closed end, and a temperature-responsive means within said hollow trunnion actuating said slide for controlling the flow of lubricant from said hollow trunnion to said crank case in accordance with the temperature of said lubricant.

2. The combination according to claim 1, in which said temperature-responsive device comprises a bellows of flexible material mounted coaxially to said bore.

MARTIN DUCKSTEIN.